(12) United States Patent
Katano

(10) Patent No.: US 8,289,558 B2
(45) Date of Patent: Oct. 16, 2012

(54) COMMUNICATION APPARATUS, SYSTEM, AND METHOD FOR UPDATING A VARIABLE ADDRESS OF A DEVICE

(75) Inventor: Kiyoshi Katano, Chiba (JP)

(73) Assignee: Canon Kabushika Kaisha, Tokyo (JP)

( * ) Notice: Subject to any disclaimer, the term of this patent is extended or adjusted under 35 U.S.C. 154(b) by 0 days.

(21) Appl. No.: 13/241,710

(22) Filed: Sep. 23, 2011

(65) Prior Publication Data

US 2012/0008519 A1  Jan. 12, 2012

Related U.S. Application Data

(63) Continuation of application No. 11/420,532, filed on May 26, 2006, now Pat. No. 8,059,288.

(30) Foreign Application Priority Data

Jun. 6, 2005 (JP) ................................. 2005-165501

(51) Int. Cl.
  *H04L 12/26* (2006.01)
(52) U.S. Cl. ........ 358/1.15; 709/204; 709/224; 370/338
(58) Field of Classification Search ................. 358/1.15; 709/204, 224; 370/338
  See application file for complete search history.

(56) References Cited

U.S. PATENT DOCUMENTS

| | | | |
|---|---|---|---|
| 6,301,012 B1 | 10/2001 | White et al. | |
| 6,982,953 B1 * | 1/2006 | Swales | 370/218 |
| 2002/0065929 A1 | 5/2002 | Kamentsky et al. | |
| 2003/0097425 A1 | 5/2003 | Chen | |
| 2004/0085900 A1 | 5/2004 | Nishio | |
| 2004/0218609 A1 | 11/2004 | Foster | |
| 2004/0230703 A1 | 11/2004 | Sukigara | |
| 2004/0236829 A1 | 11/2004 | Xu et al. | |
| 2005/0068565 A1 | 3/2005 | Maeda | |
| 2005/0203647 A1 | 9/2005 | Landry et al. | |
| 2005/0207361 A1 | 9/2005 | Rosenberg et al. | |
| 2005/0259654 A1 * | 11/2005 | Faulk | 370/392 |
| 2006/0031488 A1 | 2/2006 | Swales | |

FOREIGN PATENT DOCUMENTS

| | | |
|---|---|---|
| CN | 1391173 A | 1/2003 |
| CN | 1551568 A | 12/2004 |
| JP | 2000-033755 A | 2/2000 |
| JP | 2002-007091 A | 1/2002 |
| JP | 2004-048462 A | 2/2004 |
| JP | 2005-109539 A | 4/2005 |

OTHER PUBLICATIONS

Jul. 20, 2011 Chinese Official Action in Chinese Patent Appln. No. 200910129161.X.

* cited by examiner

*Primary Examiner* — Benny Q Tieu
*Assistant Examiner* — Qian Yang
(74) *Attorney, Agent, or Firm* — Fitzpatrick, Cella, Harper & Scinto

(57) ABSTRACT

Device detection is performed by using a second detection unit which uses unicast transmission with a destination address being changed in addition to a first detection unit which uses broadcasting/multicasting. When unicast transmission can be normally performed, detection using the first detection unit is performed to determine whether broadcasting/multicasting at this point of time can be performed. In addition, the first or second detection unit is selected or the processing order of the first and second detection units is changed in accordance with the permission/inhibition determination result.

10 Claims, 16 Drawing Sheets

FIG. 11
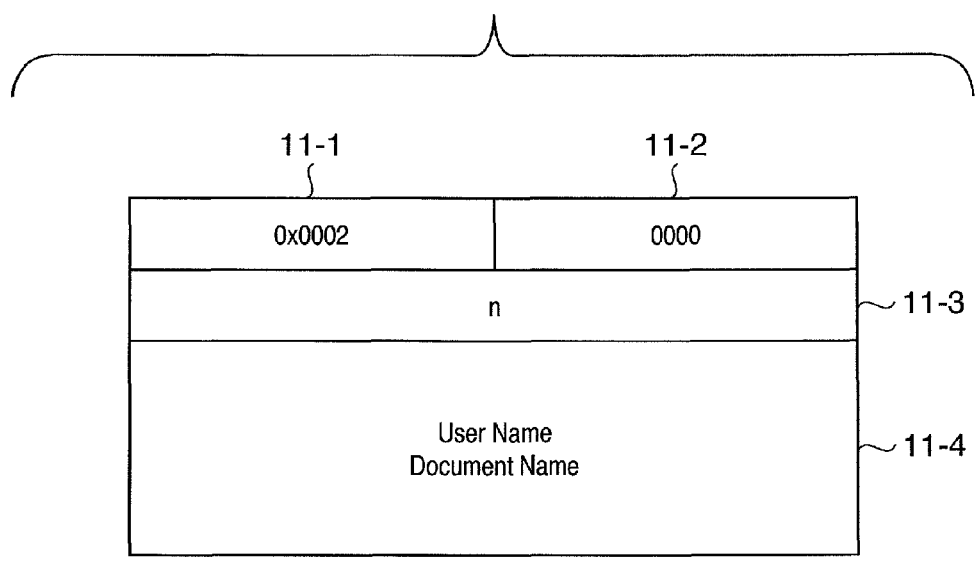
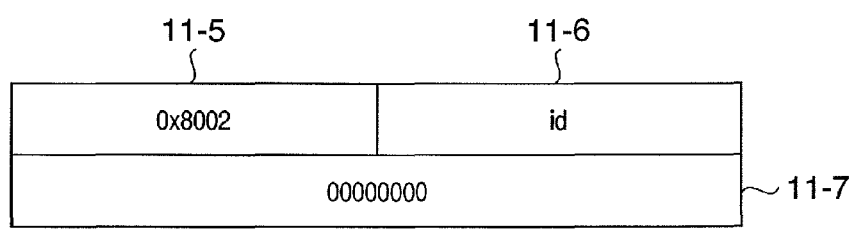

F I G. 12
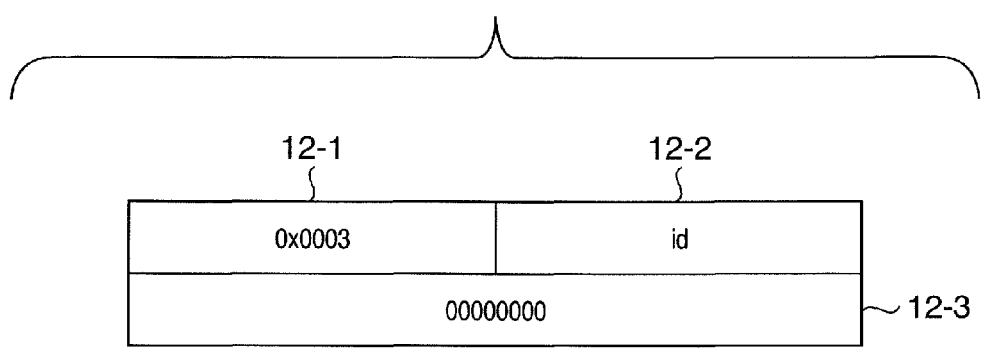
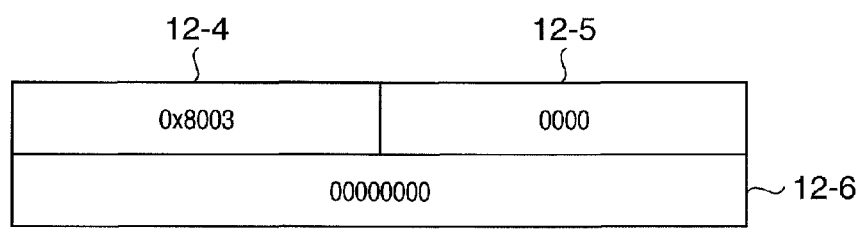

FIG. 13
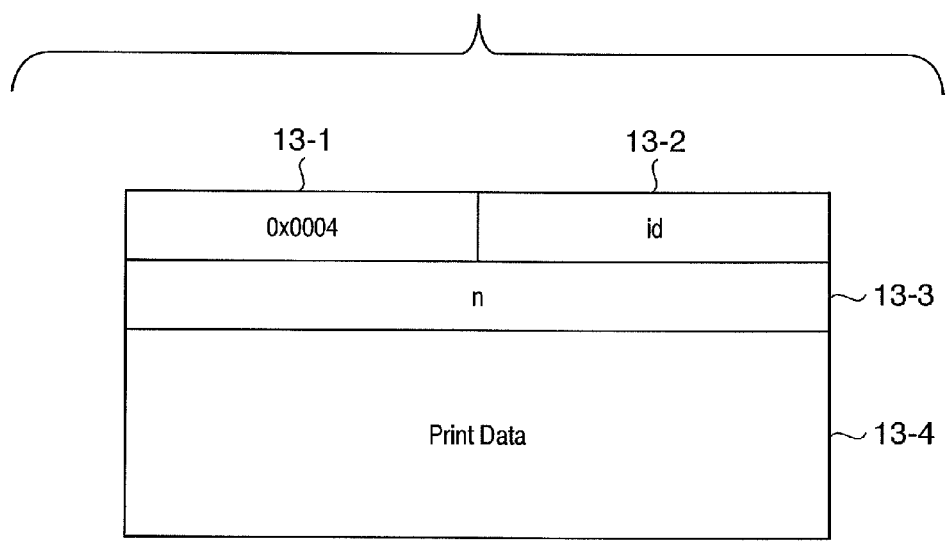
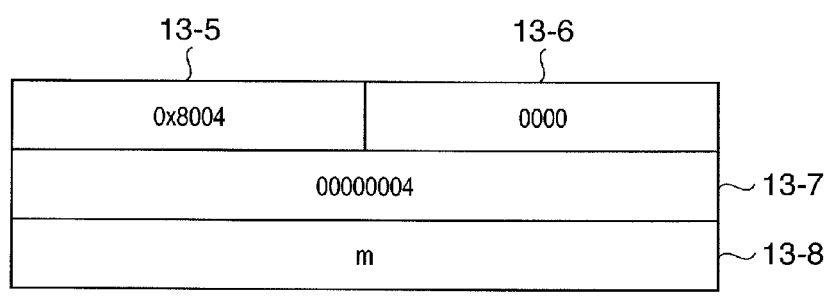

FIG. 14
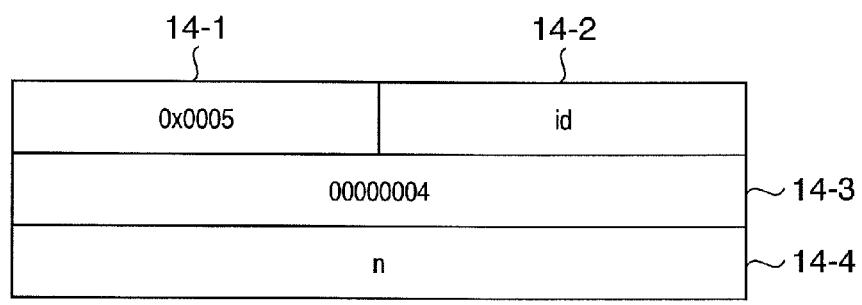
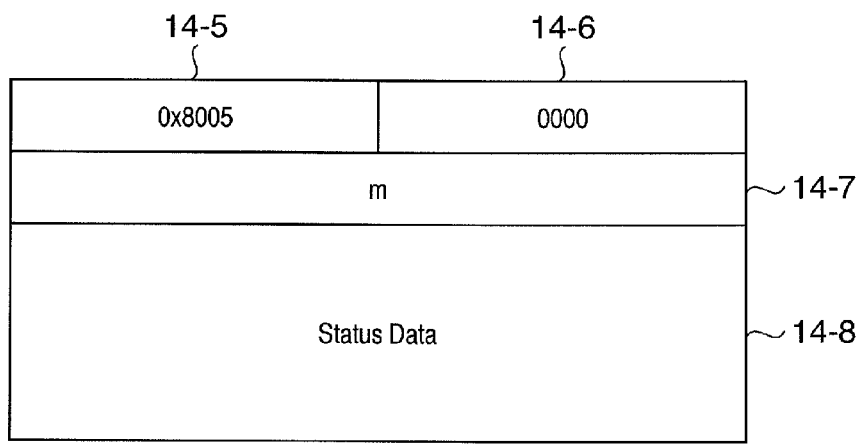

COMMUNICATION APPARATUS, SYSTEM, AND METHOD FOR UPDATING A VARIABLE ADDRESS OF A DEVICE

This application is a continuation of application Ser. No. 11/420,532 filed May 26, 2006.

FIELD OF THE INVENTION

The present invention relates to a communication apparatus, system, and method.

BACKGROUND OF THE INVENTION

With widespread use of local area networks (LANs) in general homes, an electronic device such as a printer has been shared among a plurality of computers through a LAN.

In general, LANs in homes comprise Ethernets (registered trademark) and wireless LANs, and use TCP/IP (Transmission Control Protocol/Internet Protocol).

According to TCP/IP, communication is performed with each device being specified by an IP address. However, some knowledge about networks is required for address assignment, which is difficult for a user who has no such knowledge to perform.

For this reason, in general homes, a router which connects a LAN to the Internet generally has a DHCP (Dynamic Host Configuration Protocol) server function. With this function, IP addresses are automatically assigned to connected devices. The DHCP server dynamically assigns IP addresses, and hence a connected device is not always assigned the same address every time it is activated.

When an electronic device such as a printer is to be used from a computer as a host device, the computer stores the IP address of the electronic device, and performs communication by transmitting data to the IP address. At this time, if an address different from the IP address stored in the computer is assigned to the electronic device, the computer cannot recognize any destination of communication with the electronic device, and hence cannot perform communication.

In order to solve this problem, there is provided a method in which if the computer cannot perform communication to the IP address of the electronic device which is stored in the computer, a communication destination is detected by a broadcasting or multicasting technique of transmitting packets to unspecified devices. In this method, the computer stores a variable value called the IP address of a given device and a value unique to the device such as a MAC address in advance, and broadcasts inquiries about IP addresses. Upon receiving this inquiry, the device returns a response containing the unique value (MAC address). Upon receiving the response, the device compares the stored unique value with the unique value contained in the response to check whether the device which has returned the response is a communication destination. In addition, containing the IP address in the response makes it possible to check the IP address of the communication destination.

The followings are examples of automatically recognizing a peripheral apparatus such as a printer connected to a network under an environment where a DHCP server dynamically assigns IP addresses.

An example of acquiring printer information by using a service location protocol (SLP) is disclosed in, for example, Japanese Patent Laid-Open No. 2000-033755.

An example of making a printer and server connected to a network function as DHCP servers is disclosed in, for example, Japanese Patent Laid-Open No. 2002-007091.

An example of recognizing a change in the combination of an IP address and a MAC address is disclosed in, for example, Japanese Patent Laid-Open No. 2004-048462.

Recently, with increasing awareness of security, firewall software has been widely used in home computers. A firewall is designed to prevent unauthorized external access and unauthorized connection to a host by monitoring network communication performed by a computer and limiting communication.

Broadcasting or multicasting is performed with respect to unspecified hosts. Therefore, depending on the settings of firewall software, communication by a computer using broadcasting or multicasting may be limited. More specifically, for example, a response to a request broadcast by an application may be blocked by a firewall and cannot reach the application.

In such situation, an electronic device assigned an address different from a previously assigned address by a DHCP server cannot be detected by broadcasting/multicasting.

In addition, firewall software exists in various forms, e.g., software included as a standard accessory in an operating system and software available from a third party, and no method exists which can know the settings of the software from another application. Even if, therefore, a firewall is set to inhibit the use of broadcasting/multicasting, no application can know the setting. That is, when a given device cannot receive a response to a broadcast or multicast request, the device cannot discriminate whether a response could not be received because a remote device is not powered on or because it is blocked by firewall.

SUMMARY OF THE INVENTION

The present invention has been made in consideration of these problems, and has as its object to detect a device even in a situation in which broadcasting or multicasting cannot be used.

It is another object of the present invention to efficiently determine whether broadcasting or multicasting can be performed.

It is still another object of the present invention to efficiently perform device detection by using the result of permission/inhibition determination on broadcasting or multicasting.

According to an aspect of the present invention, a communication apparatus includes a first detection unit configured to detect a communication partner by using broadcasting or multicasting, and a second detection unit configured to detect the communication partner by repeatedly using unicast transmission with a destination address being changed, wherein the communication partner is detected by using the first and second detection units.

According to another aspect of the present invention, a communication apparatus includes a communication unit configured to perform communication using broadcasting or multicasting when performing communication using unicasting, and a determination unit configured to determine permission/inhibition of broadcasting or multicasting in accordance with the presence/absence of a response to broadcasting or multicasting by the communication unit.

According to still another aspect of the present invention, a communication apparatus includes a first detection unit configured to detect a communication partner by using broadcasting or multicasting, a second detection unit configured to detect the communication partner by repeatedly using unicast transmission with a destination address being changed, a storage unit configured to store information indicating whether broadcasting or multicasting can be performed, and a selection unit configured to select detection using the first detection unit or detection using the second detection unit in accordance with information indicating permission/inhibition of broadcasting or multicasting which is stored in the storage unit.

According to still another aspect of the present invention, a communication apparatus includes a first discrimination unit configured to discriminate an address of a communication partner by using broadcasting or multicasting, a second discrimination unit configured to discriminate an address of the communication partner by repeatedly using unicast transmission with a destination address being changed, a third discrimination configured to discriminate a network environment, and an execution unit configured to execute discrimination using the first discrimination unit or the second discrimination unit in accordance with discrimination by the third discrimination unit.

According to still another aspect of the present invention, a communication system including the above communication apparatus, a device detection method using the above communication apparatus, a method of determining whether broadcasting or multicasting is permitted, and an address discrimination method.

The above and other objects and features of the present invention will appear more fully hereinafter from a consideration of the following description taken in connection with the accompanying drawing wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 is a view showing a session initiation command request and response;

FIG. 12 is a view showing a session termination command request and response;

FIG. 13 is a view showing a data write command request and response;

FIG. 14 is a view showing a data read command request and response;

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.
(First Embodiment)

Figure 1:
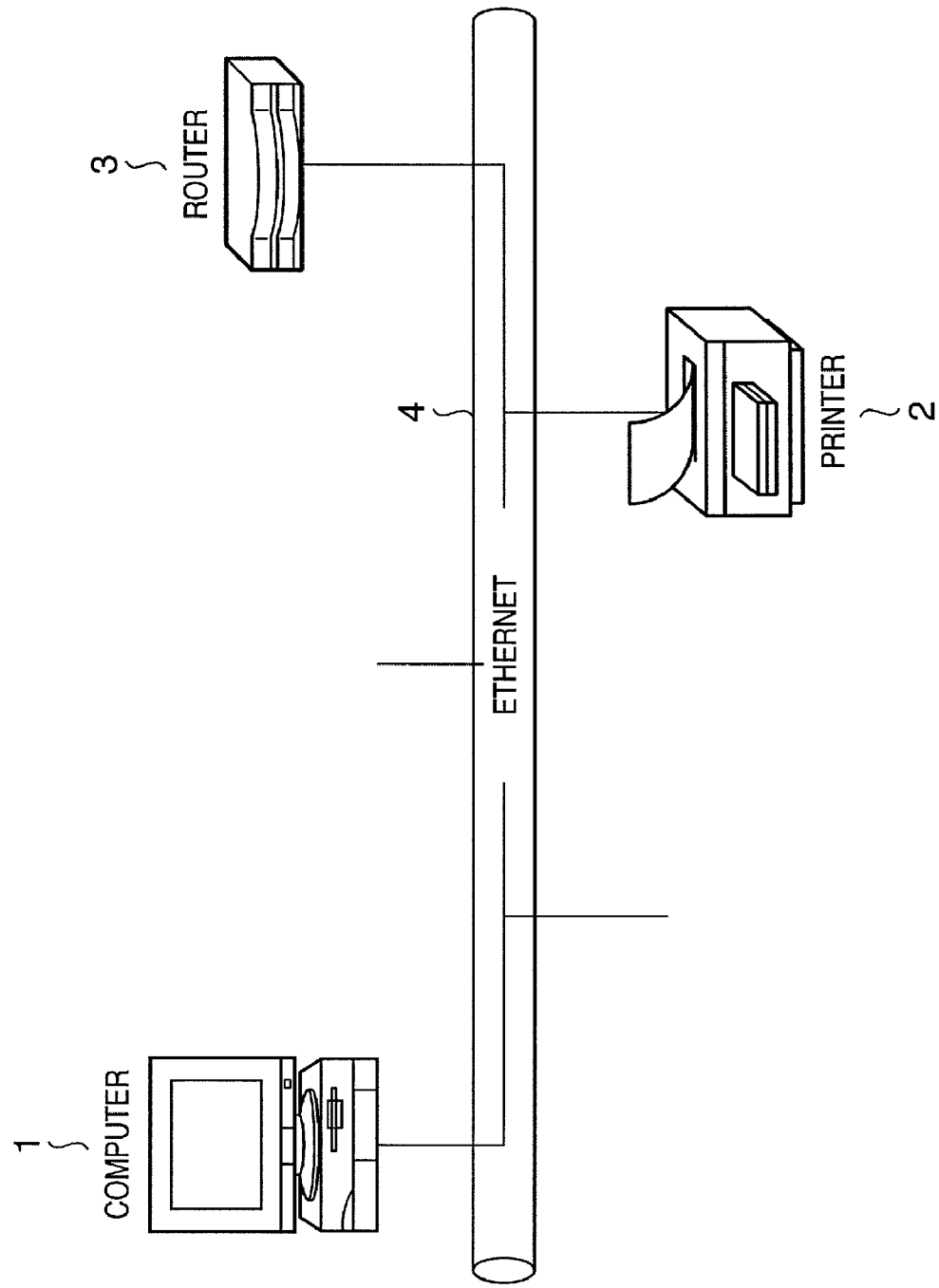
FIG. 1 is a view showing an example of a device arrangement according to an embodiment.

FIG. 1 is a view showing an example of the device arrangement of this embodiment.

Referring to FIG. 1, reference numeral 1 denotes a computer; 2, a printer; 3, a router; and 4, an Ethernet (registered trademark). Assume that the computer 1, printer 2, and router 3 are connected to each other through the Ethernet (registered trademark) 4, and perform communication in accordance with a TCP/IP protocol (IPv4). The router 3 has a DHCP server function. The computer 1 and the printer 2 are assigned IP addresses by the router 3.

In this embodiment, the computer 1 and the printer 2 have been set such that the computer 1 can perform printout operation with respect to the printer 2. Assume that the printer 2 stores in advance the IP address and MAC address of the printer 2 in a storage unit (not shown) such as a memory. Although this embodiment will exemplify a MAC address as information unique to a device, a device ID, device name, or the like may be used as long as it is information unique to the device.

Assume that the operating system in the computer 1 in this embodiment is Windows (registered trademark).

Figure 2:
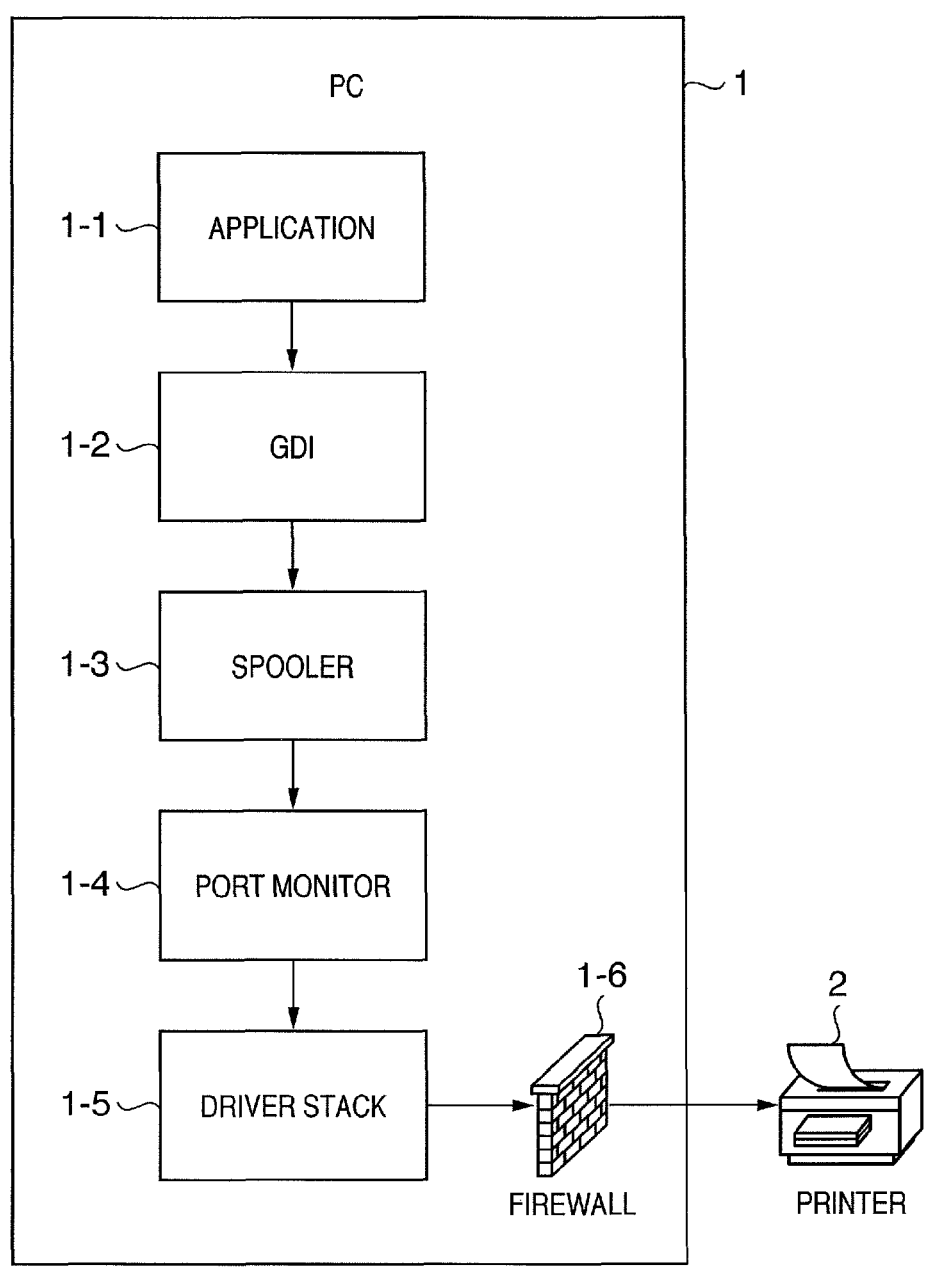
FIG. 2 is a view schematically showing the software arrangement of a computer in the embodiment.

FIG. 2 is a view schematically showing the software arrangement of the computer 1 in this embodiment. FIG. 2 is a schematic view mainly showing software associated with printing based on Windows (registered trademark), but a portion irrelevant to the embodiment of the present invention is omitted.

Referring to FIG. 2, reference numeral 1-1 denotes an application; 1-2, a GDI (Graphics Device Interface); 1-3, a spooler; 1-4, a port monitor; 1-5, a driver stack; and 1-6, a firewall. The application 1-1 calls up the function of the GDI 1-2 and generates a print job. The GDI 1-2 is a graphic output interface of Windows (registered trademark). The GDI 1-2 performs graphic drawing in response to a call from the application, and transfers the print data to the spooler 1-3. The spooler 1-3 manages print jobs, spools print data, and calls up the port monitor 1-4. In response to a call from the spooler 1-3, the port monitor 1-4 transmits print data to the printer 2 through the driver stack 1-5 or receives data from the printer 2. In response to a call from the port monitor 1-4, the driver stack 1-5 communicates with the printer 2 in accordance with the TCP/IP protocol. The driver stack 1-5 also transmits the data transferred from the port monitor to the printer 2, and transfers the data received from the printer 2 to the port monitor. The firewall 1-6 monitors the network input/output operation of the computer 1, and limits input/output operation as needed. Therefore, transmission data from the port monitor may not be transmitted to the printer 2, or reception data from the printer 2 may not be transferred to the port monitor 1-4.

The main functions of the port monitor 1-4 which are called from the spooler 1-3 include OpenPort( ), StartDocPort( ), WritePort( ), ReadPort( ), EndDocPort( ), and ClosePort( ). OpenPort( ) is called to initiate a call to the port monitor 1-4. ClosePort( ) is called to terminate access. StartDocPort( ) is called to initiate the printing of a document. EndDocPort( ) is called to terminate the printing of a document. WritePort( ) is called to write transmission data. ReadPort( ) is called to read out reception data.

The network commands defined in this embodiment are used for access to the printer 2 through the network. As the network commands, there are prepared commands for information retrieval, session initiation, data writing, data reading, and session termination. Each command comprises a request packet transmitted from the computer 1 to the printer 2 and a response packet transmitted from the printer 2 to the computer 1 in response to a request.

Each of the request and response packets of each command comprises an 8-byte header and a variable-length data portion. Each header comprises a 2-byte ID, 2-byte parameter, and 4-byte data length. A data length indicates the number of bytes of a data portion. The value of the ID of a request packet indicates a command ID. The value of the ID of a response packet is the value obtained by setting the most significant bit of the command ID.

Figure 10:
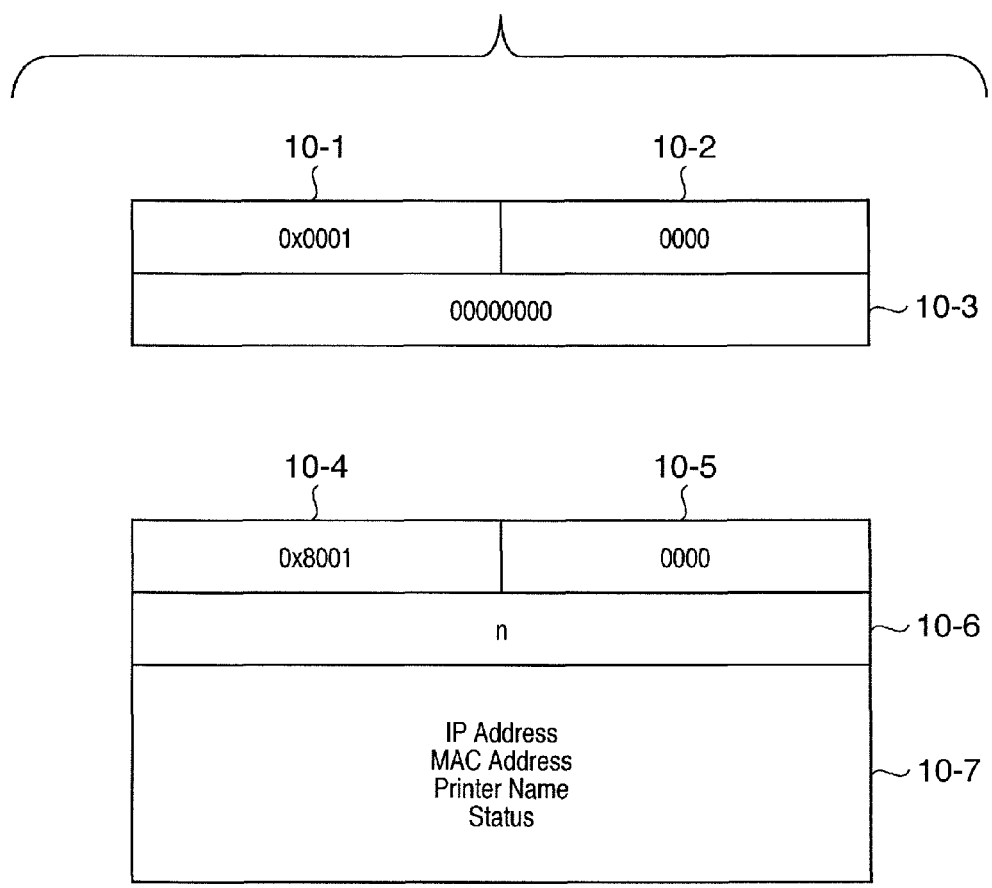
FIG. 10 is a view showing an information retrieval command request and response.

FIG. 10 is a view showing the request and response packets of an information retrieval command.

Referring to FIG. 10, reference numeral 10-1 denotes an ID, whose value is set to 0x0001 which is the command ID of an information retrieval command; 10-2, a parameter, whose value is set to 0; and 10-3, a data length, whose value is set to 0. The above constitute the request packet of an information retrieval command. In addition, referring to FIG. 10, reference numeral 10-4 denotes an ID, whose value is set to 0x8001 obtained by setting the most significant bit of the command ID of an information retrieval command; 10-5, a parameter, whose value is set to 0 which indicates a success; 10-6, a data length, whose value indicates a data length n of a data portion 10-7; and 10-7, a data portion, which contains the IP address, MAC address, printer name, and printer status of the printer 2. The above constitute the response packet of an information retrieval packet.

FIG. 11 is a view showing the request and response packets of a session initiation command.

Referring to FIG. 11, reference numeral 11-1 denotes an ID, whose value is set to 0x0002 which is the command ID of a session initiation command; 11-2, a parameter, whose value is set to 0; 11-3, a data length, whose value indicates a length n of a data portion 11-4; and 11-4, a data portion, which contains the user name, document name, and the like of a print job. The above components constitute the request packet of the session initiation command. In addition, referring to FIG. 11, reference numeral 11-5 denotes an ID, whose value is set to 0x8002; 11-6, a parameter, whose value is set to id which specifies a session when the command is successful; and 11-7, a data length, whose value is set to 0. The above components constitute the response packet of the session initiation command.

FIG. 12 is a view showing the request and response packets of a session termination command.

Referring to FIG. 12, reference numeral 12-1 denotes an ID, whose value is set to 0x0003 which is the command ID of the session termination command; 12-2, a parameter, whose value is set to the id returned from the printer 2 with a session initialization command; and 12-3, a data length, whose value is set to 0. The above components constitute the request packet of the session termination command. In addition, referring to FIG. 12, reference numeral 12-4 denotes an ID, whose value is set to 0x8003; and 12-5, a parameter, whose value is set to 0 when the command is successful. The above components constitute the response packet of the session termination command.

FIG. 13 is a view showing the request and response packets of a data write command.

Referring to FIG. 13, reference numeral 13-1 denotes an ID, whose value is set to 0x0004 which is the command ID of the data write command; 13-2, a parameter, whose value is set to the id returned from the printer 2 with the response packet of a session initiation command; 13-3, a data length, whose value indicates a data length n of a data portion 13-4; and 11-4, a data portion, which contains print data. The above components constitute the request packet of the data write command. Referring to FIG. 13, reference numeral 13-5 denotes an ID, whose value is set to 0x8004; 13-6, a parameter, whose value is set to 0 when the command is successful; 13-7, a data length, whose value is set to 4 which is the data length of a data portion 13-8; and 13-8, a data portion. The content of the data portion 13-8 is a data length, whose value indicates a data length m of that portion of the print data of the data portion 13-4 of the request packet which is processed by the printer 2. The above components constitute the response packet of the data write command.

FIG. 14 is a view showing the request and response packets of a data read command.

Referring to FIG. 14, reference numeral 14-1 denotes an ID, whose value is set to 0x0005 which is the command ID of the data read command; 14-2, a parameter, whose value is set to the id returned from the printer 2 with the response packet of a session initiation command; 14-3, a data length, whose value is set to 4 which is the data length of a data portion 14-4; and 14-4, a data portion. The content of the data portion 14-4 is a data length, whose value indicates a maximum value n of the data length of data read from the printer 2 by the computer 1. The above components constitute the request packet of the data read command. Referring to FIG. 14, reference numeral 14-5 denotes an ID, whose value is set to 0x8005; 14-6, a parameter, whose value is set to 0 when the command is successful; 14-7, a data length, which indicates a data length m of a data portion 14-8; and 14-8, a data portion, which contains printer status data. The above components constitute the response packet of the data read command.

In this embodiment, of the above network commands, the information retrieval command, session initiation command, and session termination command use UDP (User Datagram Protocol). The data write command and the data read command use TCP (Transmission Control Protocol). In the sequence executed by the computer 1, after a session initiation command is successfully executed, a TCP connection is established, and data is written/read in/from the printer 2. At the end of the operation, the computer 1 releases the TCP connection, and terminates the session by using a session termination command.

The sequence in which the spooler 1-3 calls up the port monitor 1-4 and the manner in which the computer 1 accesses the printer 2 by using network commands of the functions of the port monitor 1-4 will be described next.

First of all, OpenPort( ) is called to start access to the port monitor 1-4, and StartDocPort( ) is then called to start printing a document.

With function StartDocPort( ) first of all, the printer 2 as an output destination is checked by using an information retrieval command.

Figure 16:
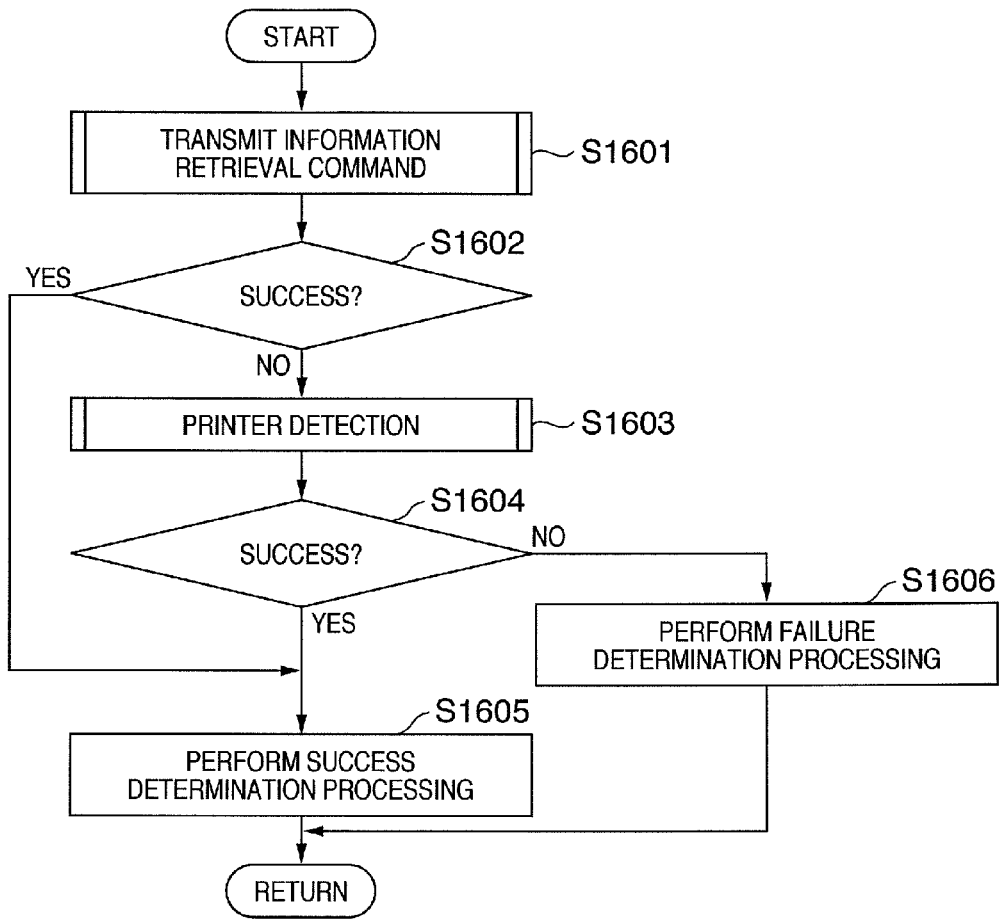
FIG. 16 is a flowchart showing printer check processing at the start of printing.

FIG. 16 is a flowchart of printer check processing performed by the computer 1.

Referring to FIG. 16, first of all, in step S1601, a request for an information retrieval command is transmitted to the stored IP address destination of the printer 2, and a response is received. In step S1602, the result is determined. In this determination, when a response to the information retrieval command is received, the MAC address contained in the response is compared with the MAC address of the printer 2 which is stored in the storage unit by the computer 1. If this comparison result indicates that the MAC addresses match each other, the flow advances to step S1605. If no response can be received or the MAC address contained in the data portion of the received response does not match the stored MAC address of the printer 2, the flow advances to step S1603.

In step S1603, printer detection processing is performed. The contents of processing will be described later. In step S1604, the printer detection result is determined. If a printer can be detected (success), the flow advances to step S1605. If no printer can be detected and the printer detection fails, the flow advances to step S1606.

In step S1605, success determination processing is performed by comparing the IP address of the printer 2 which is stored by the computer 1 with the IP address of the printer 2 which is contained in the response. If this comparison result indicates that the IP addresses differ from each other, since the IP address of the printer 2 has been changed, the IP address stored in the storage unit is updated to the changed IP address. That is, the IP address is updated to the IP address contained in the response. In step S1606, failure determination processing is performed to return an error to the spooler 1-3.

If the printer check is successful, the computer 1 issues a session initiation request to the printer 2 by using a session initiation command. If the session initiation is successful, the computer 1 establishes a TCP connection with the printer 2 to set a data writable/readable state, and returns a success status to the spooler 1-3.

If the printer check or session initiation fails, the computer 1 returns a failure status to the spooler 1-3. The printing operation is interrupted at this point of time.

If StartDocPort( ) is terminated with a success status, the spooler calls up WritePort( ) and ReadPort( ), as needed, to write and read data.

With function WritePort( ), the data transferred from the spooler 1-3 to the printer 2 is written by using a data write command.

With function ReadPort( ), the data transferred from the printer 2 to the spooler 1-3 is read out by using a data read command.

When necessary write and read operations are complete, the spooler 1-3 calls up EndDocPort( ) to terminate the printing of a document, and calls up ClosePort( ) to terminate access to the port monitor.

With function EndDocPort( ), the TCP connection is released, and the session is terminated by using a session termination command.

Consider the flow of the above printer check processing upon assignment of a specific IP address to the device. Assume that in the arrangement shown in FIG. 1, permanent address 192.168.0.1 has been assigned to the router 3, and 192.168.0.2 and 192.168.9.3 have been assigned to the computer 1 and the printer 2, respectively. Assume also that the computer 1 has been set such that it can perform printout operation with respect to the printer 2. In this case, the IP address and MAC address of the printer 2 are stored in the storage unit (not shown) of the printer 2, and the stored IP address is 192.168.0.3.

In this state, the IP address stored by the computer 1 matches the actual IP address of the printer 2. For this reason, in step S1601, the request packet of the information retrieval command transmitted to IP address 192.168.0.3 reaches the printer 2. The computer 1 receives the response packet returned from the printer 2 and can check the printer 2.

A case wherein the device arrangement has changed, and so has the IP address will be described next.

Figure 15:
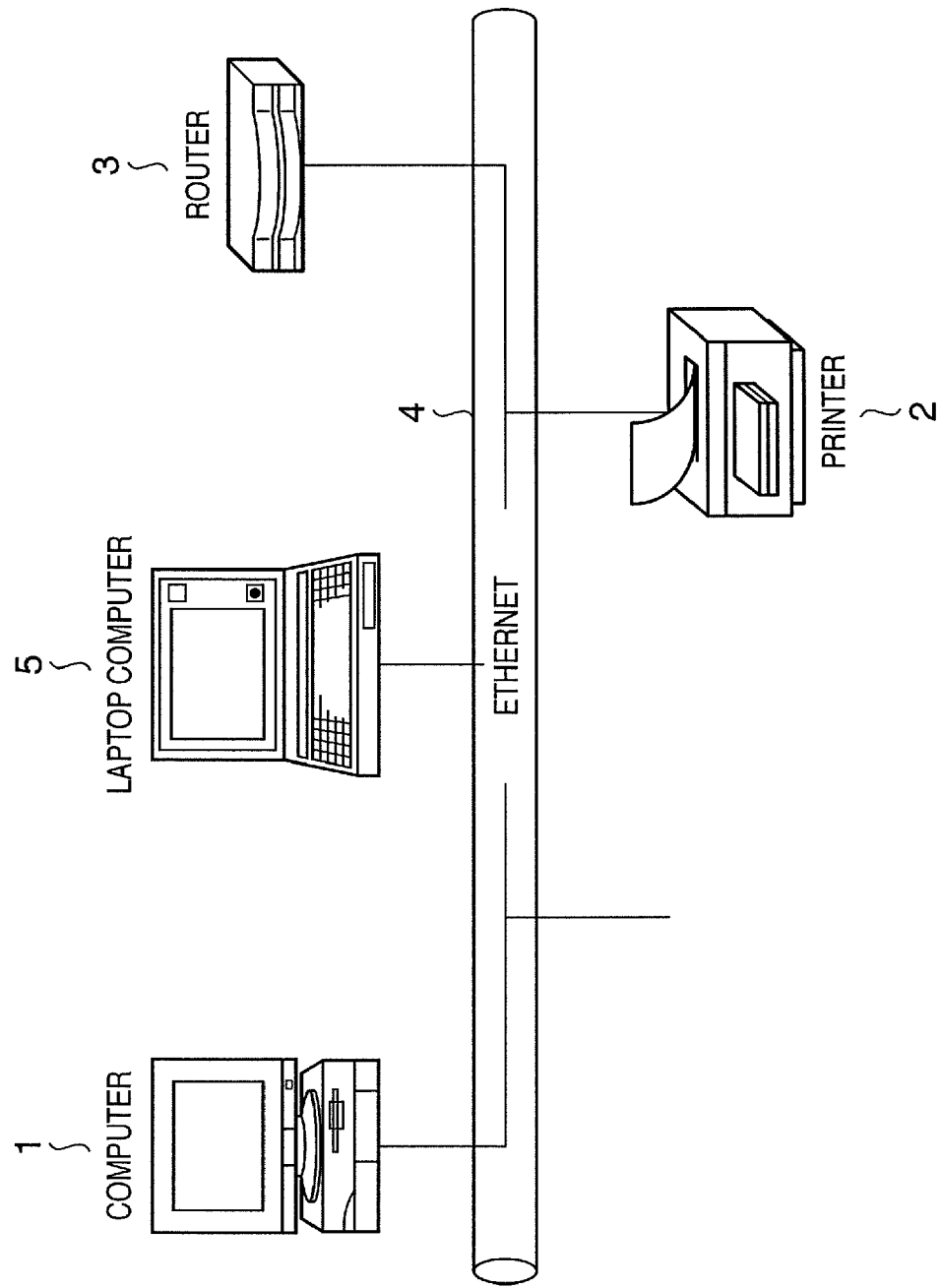
FIG. 15 is a view showing an arrangement obtained by adding another device to the device arrangement shown in FIG. 1.

FIG. 15 is a view showing the arrangement obtained by adding another device to the device arrangement shown in FIG. 1.

Referring to FIG. 15, reference numeral 5 denotes a laptop computer.

Assume that in the arrangement shown in FIG. 15, the router 3, computer 1, laptop computer 5, and printer 2 are sequentially powered on in the order named. Assume that the DHCP server function of the router 3 has assigned permanent address 192.168.0.1 to the router 3; 192.168.0.2 to the computer 1; 192.168.0.3, which had been assigned to the printer 2, to the laptop computer 5; and 192.168.0.4 to the printer 2.

In this state, the IP address stored by the computer 1 does not match the actual IP address of the printer 2. For this reason, in step S1601, the request packet of the information retrieval command transmitted to IP address 192.168.0.3 stored by the computer 1 does not reach the printer 2. The computer 1 cannot therefore receive a response from the printer 2, and a failure is determined in step S1602. The flow then advances to printer detection processing in step S1603.

Printer detection processing in this embodiment will be described below.

Printer detection processing using broadcasting/multicasting which is the first detection processing used in printer detection processing in this embodiment will be described first.

Figure 3:
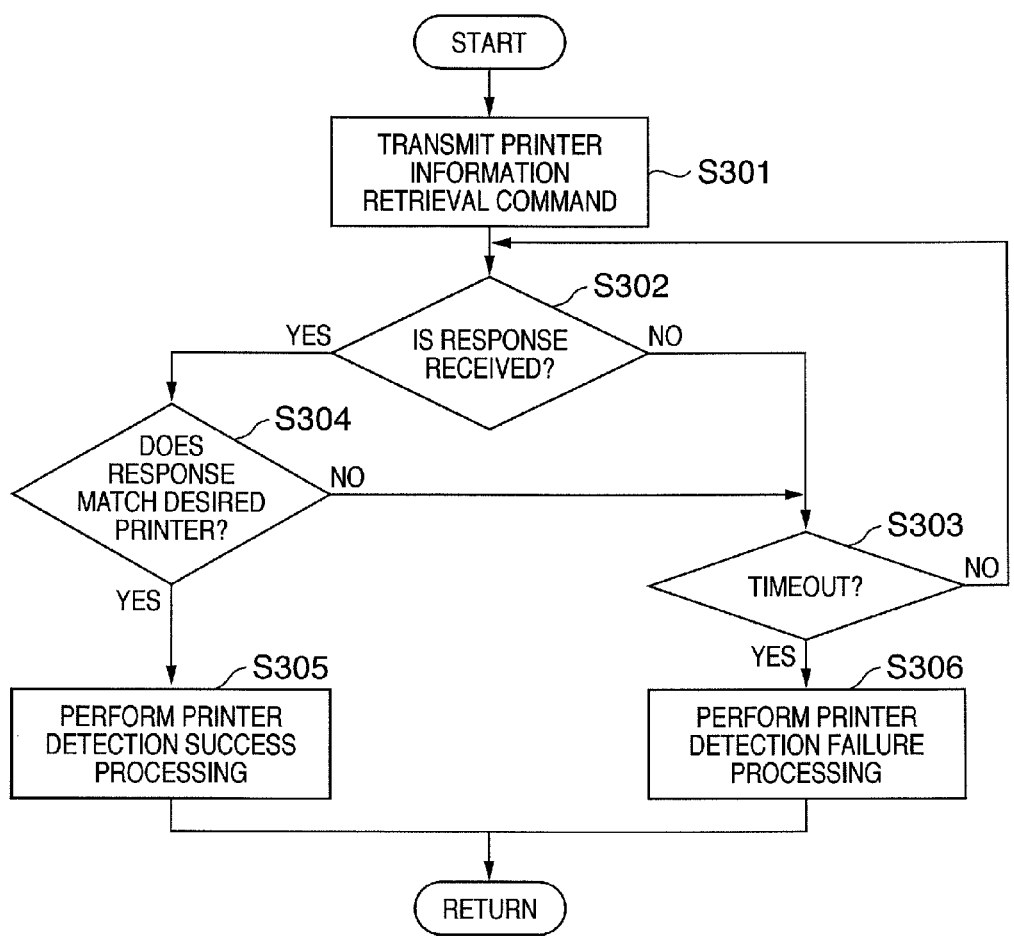
FIG. 3 is a flowchart showing printer detection processing using broadcasting/multicasting.

FIG. 3 is a flowchart showing printer detection processing using broadcasting/multicasting executed by the computer 1.

First of all, in step S301, the computer 1 transmits a printer information retrieval command. At this time, as a destination address, for example, a limited broadcast address (255.255.255.255), net direct broadcast address (192.168.0.255 in this embodiment), or a multicast address (224.0.0.1) indicates all systems on a subnet is designated. That is, in step S301, the computer 1 broadcasts or multicasts the printer information retrieval command.

In step S302, the computer 1 waits for the reception of a response corresponding to the printer information retrieval command. A timeout is set for the reception of a response, and the computer 1 determines in step S303 whether a response can be received within the time.

If a response can be received, the flow advances to step S304 to determine whether the response is from a desired printer (printer 2). In this determination, it is determined whether the MAC address contained in the received response matches the MAC address of the printer 2 which is stored in the storage unit by the computer 1. If they match each other, the computer 1 performs printer detection success processing in step S305 upon determining that the received response is from the desired printer. In the printer detection success processing, the computer 1 updates the IP address contained in the received response as the IP address of the printer 2. The computer 1 then terminates the printer detection processing.

If no response is obtained in step S302, and the MAC address contained in the response does not match that of the desired printer in step S304, the computer 1 determines in step S303 whether a predetermined period of time has elapsed. If the predetermined period of time has not elapsed, the flow returns to step S302 to wait for the reception of a response. If the predetermined period of time has elapsed, the computer 1 performs printer detection failure processing in step S306, and terminates the detection processing.

Printer detection processing using unicasting which is the second detection processing used in printer detection processing in this embodiment will be described next.

Figure 4:
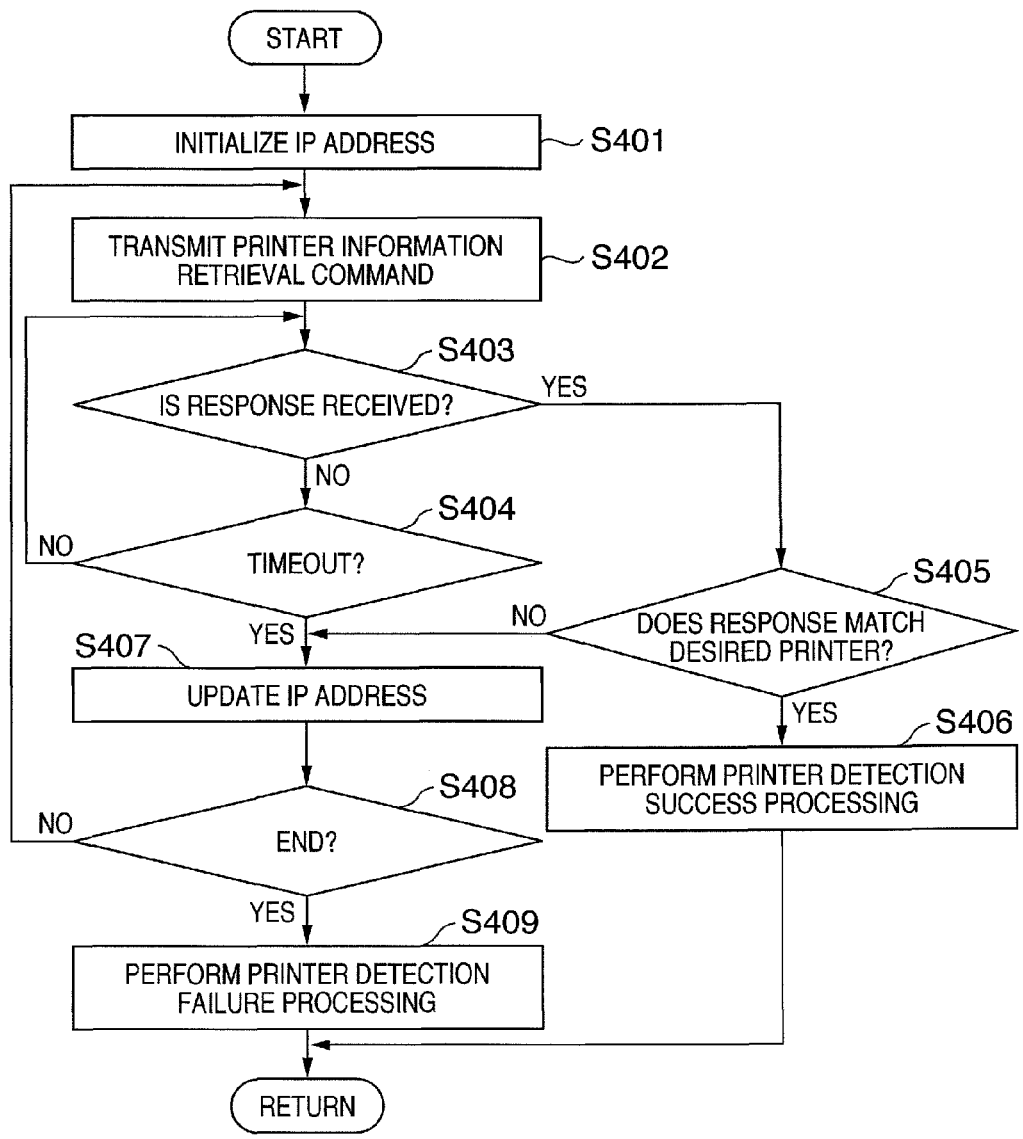
FIG. 4 is a flowchart showing printer detection processing using unicasting.

FIG. 4 is a flowchart showing printer detection processing using unicasting.

First of all, in step S401, the computer 1 initializes a variable X for storing the IP address of a destination.

In step S402, the computer 1 designates the value of X as a destination IP address, and unicasts a printer information retrieval command.

In step S403, the computer 1 waits for the reception of a response. A timeout is set the reception of a response, and the computer 1 determines in step S404 whether a response can be received within the time.

If a response can be received, the computer 1 determines in step S405 whether the device which has transmitted the response is a desired printer (printer 2). In this determination, it is determined whether the MAC address contained in the received response matches the MAC address of the printer 2 which is stored in the storage unit by the computer 1. If they match each other, the computer 1 determines that the response is from the desired printer, and performs printer detection success processing in step S406. In the printer detection success processing, the computer 1 updates the IP address contained in the received response as the IP address of the printer 2. The computer 1 then terminates the printer detection processing.

If the computer 1 determines in step S403 that no response can be received or determines in step S405 that the MAC address contained in the response does not match that of the desired printer, the computer 1 updates the variable X of the destination IP address. In step S408, the computer 1 determines whether detection of all destination addresses is terminated. If NO in step S408, the flow returns to step S402 to perform detection again. If YES in step S408, printer detection failure processing is performed in step S409, and terminates the detection processing.

The initial value of the variable X of a destination IP address and its range will be described below.

The DHCP server function of a router used in a home generally assigns a predetermined number of consecutive IP addresses from a given IP address. For example, permanent address 192.168.0.1 is assigned to the router, and 16 addresses from 192.168.0.2 are assigned to connected devices. The address of the printer 2 should be detected by detecting several addresses before and after the original address (i.e., the address stored by the computer 1) of the printer 2.

For example, therefore, there is available a method of setting a variable X range which includes 16 addresses each before and after the stored IP address with the address next to the address stored by the computer 1 being set as an initial value. In this case, if the X range reaches 192.168.0.0 and 192.168.0.255, these addresses may be set as the boundary of the range. In addition, if the network has subnets, a range may be determined in consideration of a subnet mask.

In addition, a log of IP addresses assigned to the printer 2 may be stored to adjust the X range.

As a reference for the initial value of X, the address of the computer 1 itself may be used. Alternatively, the address of the router 3 (which is often transferred as a default gateway address to a device) may be used as a reference.

Alternatively, the user may be allowed to set an initial value and a range.

Furthermore, a printer may be detected as follows. A range is divided into smaller ranges, and detection is performed in each smaller range. If a desired printer cannot be detected in a given smaller range, an inquiry is made to the user, and detection may be performed in the remaining smaller ranges in accordance with an instruction from the user.

Printer detection processing in this embodiment will be described.

Figure 5:
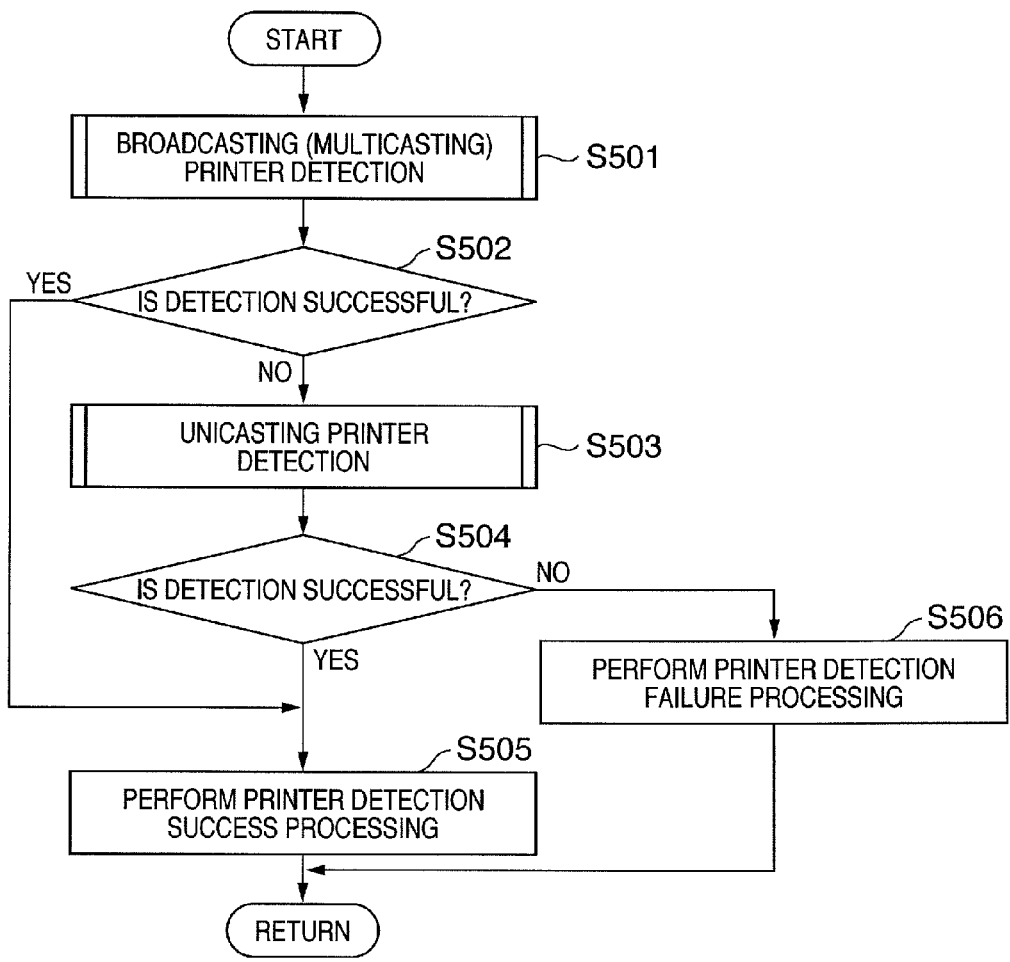
FIG. 5 is a flowchart showing printer detection processing according to the first embodiment.

FIG. 5 is a flowchart showing printer detection processing by combining the printer detection processing described with reference to FIG. 3 and the printer detection processing described with reference to FIG. 4.

First of all, in step S501, the printer detection processing using broadcasting/multicasting which has been described with reference to FIG. 3 is performed. In step S502, it is determined whether a desired printer can be detected. If a desired printer cannot be detected and a failure is determined, the printer detection processing using unicasting which has been described with reference to FIG. 4 is performed in step S503. It is then determined in step S504 whether a desired printer can be detected.

If it is determined in step S502 or S504 that a desired printer can be detected, printer detection success processing is performed in step S505 to update the IP address of the printer 2. If a failure is determined in step S504, printer detection failure processing is performed in step S506. With the above operation, the printer detection processing is terminated.

Note that the printer detection processing using broadcasting/multicasting in step S501 and the printer detection processing using unicasting in step S503 may be performed in a reverse order. Alternatively, the printer detection processing using broadcasting/multicasting and the printer detection processing using unicasting may be performed concurrently.

(Second Embodiment)

The device arrangement of the second embodiment and the software arrangement of a computer 1 are the same as those of the first embodiment, and hence a description thereof will be omitted.

Assume that in this embodiment, the computer 1 stores in advance the determination result obtained by broadcasting/multicasting permission/inhibition determination (to be described later in the third embodiment).

Figure 6:
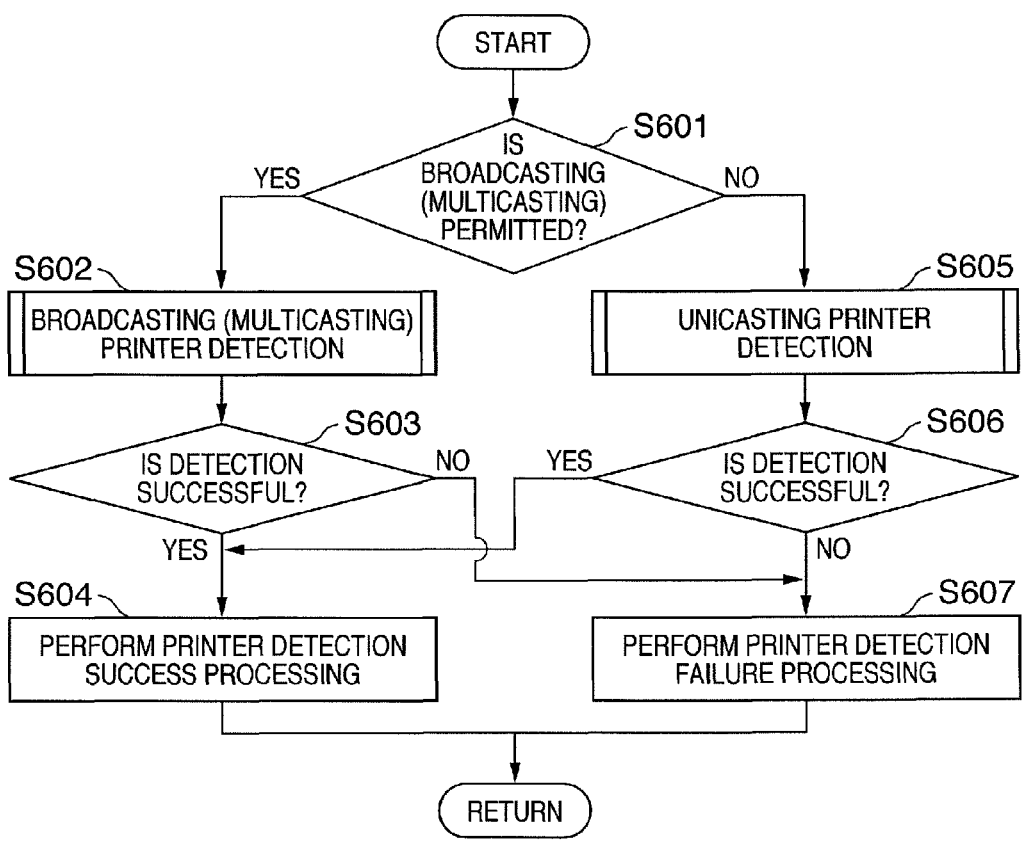
FIG. 6 is a flowchart showing printer detection processing according to the second embodiment.

FIG. 6 is a flowchart showing printer detection processing in the second embodiment.

First of all, in step S601, the computer 1 refers to the stored broadcasting/multicasting permission/inhibition processing result to determine permission/inhibition of broadcasting/multicasting.

If permission is determined, the computer 1 performs printer detection processing using broadcasting/multicasting described with reference to FIG. 3 in step S602, and determines the printer detection processing result in step S603.

If inhibition is determined in step S601, the computer 1 performs printer detection processing using unicasting described with reference to FIG. 4 in step S605, and determines the printer detection processing result in step S606.

If the computer 1 determines in step S603 or S606 that the printer detection processing is successful, the computer 1 performs printer detection success processing in step S604 to update the IP address of a printer 2. If the computer 1 determines in step S603 or S606 that the printer detection processing has failed, the computer 1 performs printer detection failure processing in step S607 to terminate the detection processing.

(Third Embodiment)

The device arrangement of the third embodiment and the software arrangement of a computer 1 are the same as those of the first embodiment, and hence a description thereof will be omitted.

Assume that in this embodiment, the computer 1 stores in advance the determination result obtained by broadcasting/multicasting permission/inhibition determination.

In this embodiment, the execution order of printer detection processing using broadcasting/multicasting and printer detection processing using unicasting is changed in accordance with the determination result of broadcasting/multicasting permission/inhibition processing.

Figure 7:
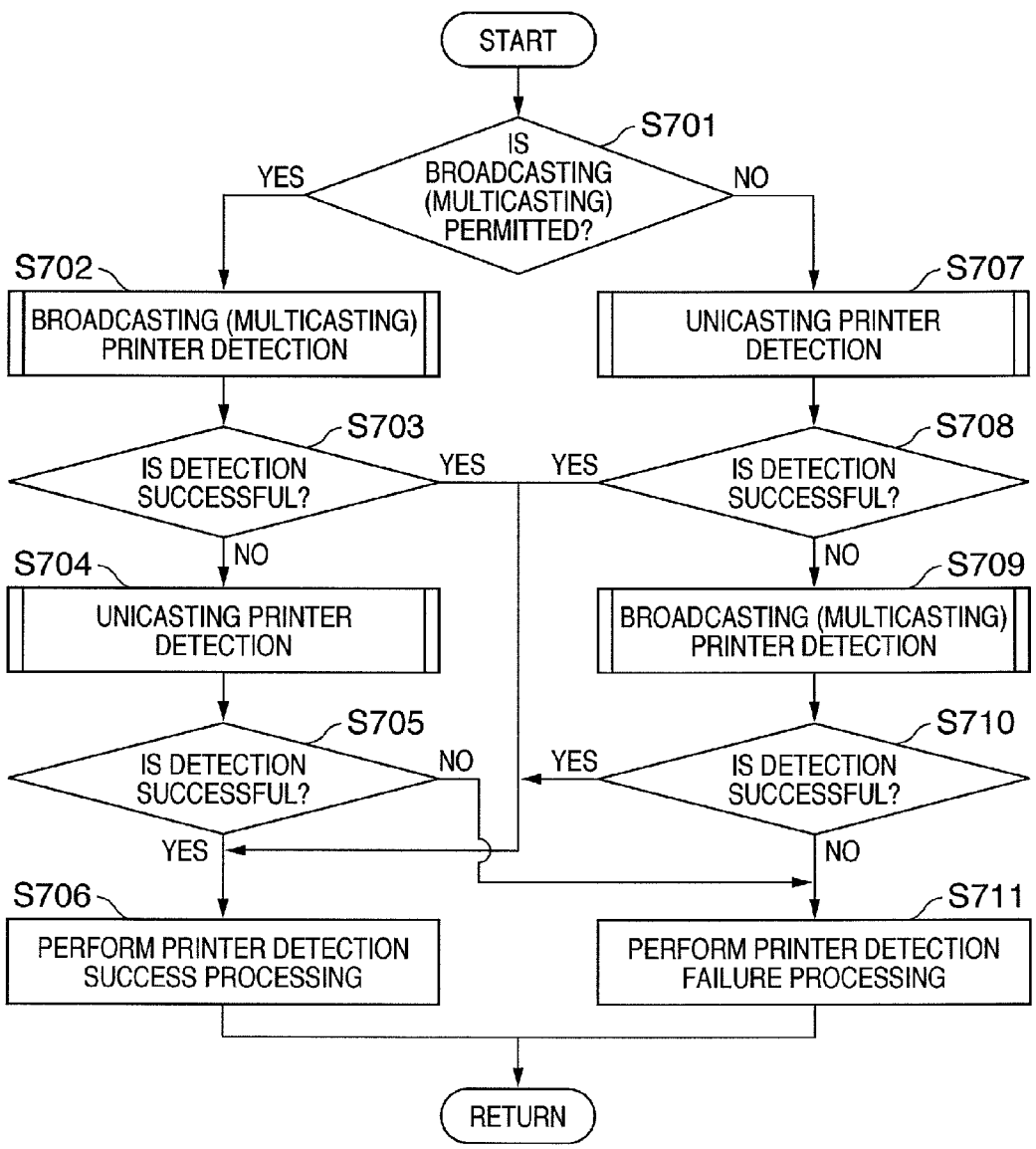
FIG. 7 is a flowchart showing printer detection processing according to the third embodiment.

FIG. 7 is a flowchart showing printer detection processing in the third embodiment.

First of all, in step S701, permission/inhibition is determined by referring to the stored broadcasting/multicasting permission/inhibition determination result.

If permission is determined, printer detection processing using broadcasting/multicasting is performed in step S702, and the result of the printer detection processing using broadcasting/multicasting is determined in step S703. If the printer detection processing result is a failure, printer detection processing using unicasting is performed in step S704. In step S705, the printer detection processing using unicasting is determined in step S705.

If inhibition is determined in step S701, printer detection processing using unicasting is performed in step S707, and the result of the printer detection processing using unicasting is determined in step S708. If the result is a failure, printer detection processing using broadcasting/multicasting is performed in step S709, and the result of the printer detection processing using broadcasting/multicasting is determined in step S710.

If it is determined in step S703, S705, S708, or S710 that the printer detection processing is successful, printer detection success processing is performed in step S706 to update the IP address of a printer 2. If it is determined in step S703, S705, S708, or S710 that the printer detection processing has failed, printer detection failure processing is performed in step S711 to terminate the detection processing.

Broadcasting/multicasting permission/inhibition determination processing in the second and third embodiments will be described below.

The first determination processing will be described first.

Figure 8:
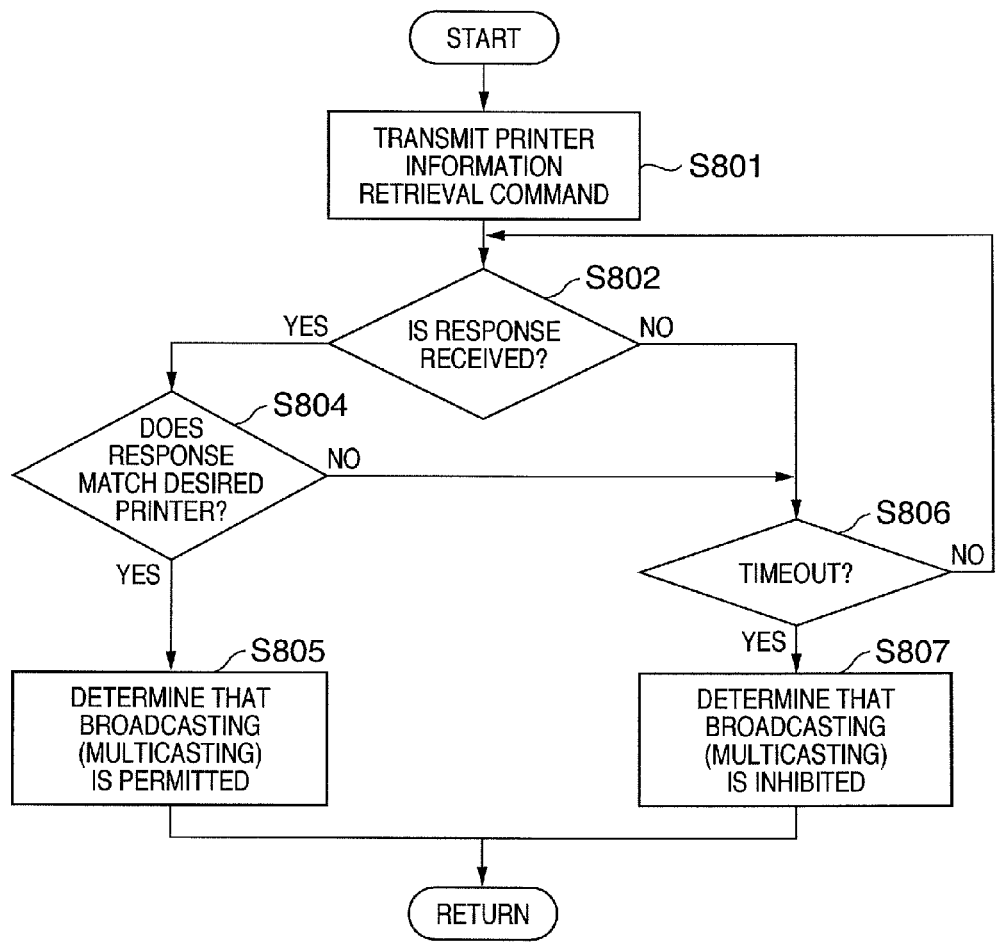
FIG. 8 is a flowchart showing the first processing of determining whether broadcasting/multicasting is permitted.

FIG. 8 is a flowchart showing the first processing of determining whether broadcasting/multicasting is permitted or inhibited.

First of all, in step S801, a printer information retrieval command is transmitted. At this time, as a destination address, for example, a limited broadcast address (255.255.255.255), a net direct broadcast address (192.168.0.225 in this embodiment), or a multicast address (224.0.0.1) indicating all systems on a subnet is designated. That is, in step S801, a printer information retrieval command is broadcast or multicast.

In step S802, the computer 1 waits for the reception of a response to the printer information retrieval command. A timeout is set for the reception, and the computer 1 determines in step S806 whether a response can be received within the time.

If a response can be received, the flow advances to step S804 to determine whether the response is from a desired printer (printer 2). In this determination, it is determined whether the MAC address contained in the received response matches the MAC address of the printer 2 which is stored in the storage unit by the computer 1. If they match each other, the computer 1 determines in step S805 that broadcasting/multicasting is permitted, stores, in the storage unit such as a memory, information indicating that an environment in which broadcasting/multicasting can be performed is set, and terminates the determination processing.

If no response can be obtained in step S802, or the response does not match a desired printer in step S804, the computer 1 determines in step S806 whether a predetermined period of time has elapsed. If NO in step S806, the flow returns to step S802 to wait for the reception of a response again. If YES in step S806, the computer 1 determines in step S807 that broadcasting/multicasting is inhibited, stores, in the storage unit such as a memory, information indicating that an environment in which broadcasting/multicasting can be performed is set, and terminates the detection processing.

The second determination processing will be described next.

Figure 9:
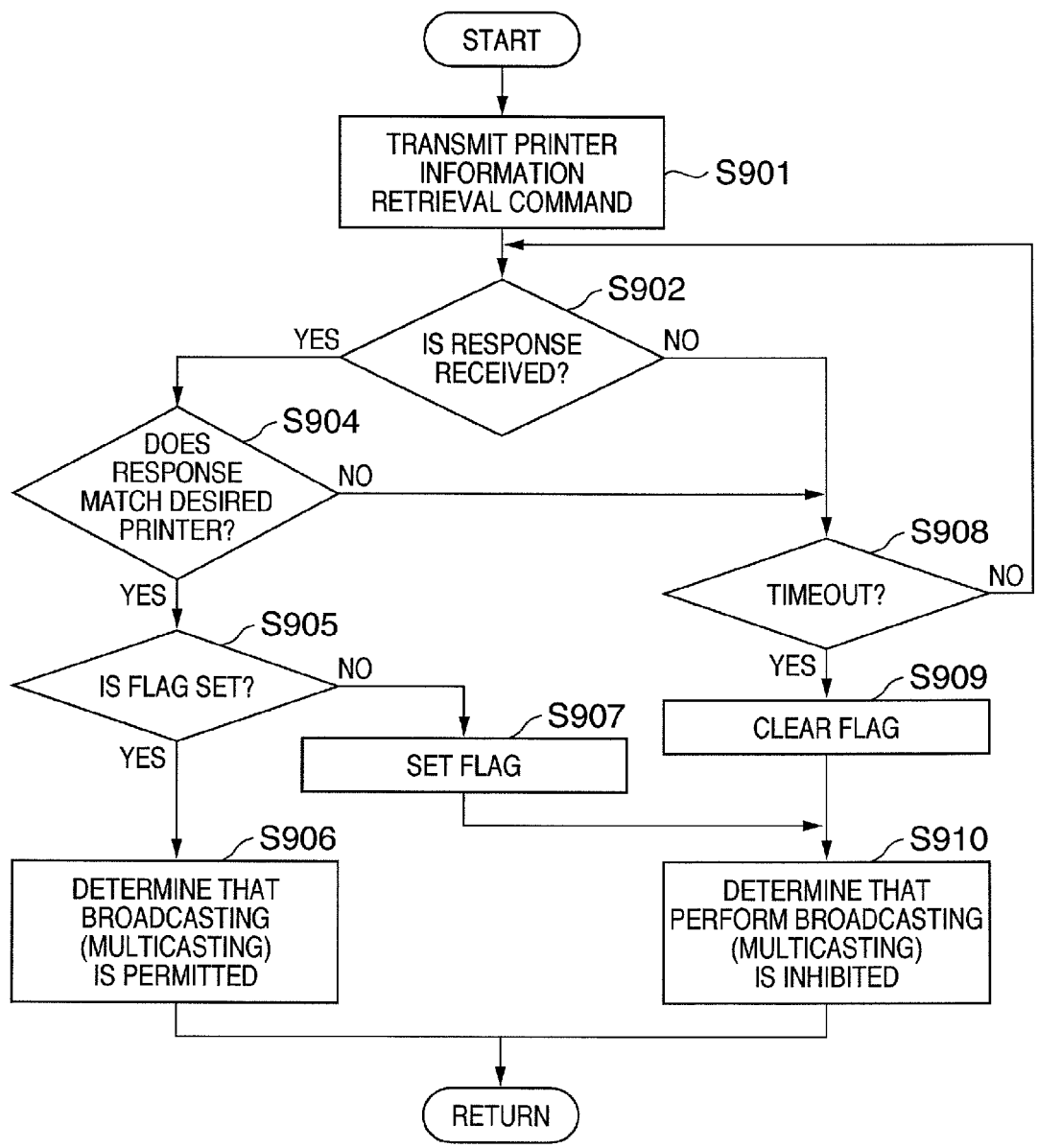
FIG. 9 is a flowchart showing the second processing of determining whether broadcasting/multicasting is permitted.

FIG. 9 is a flowchart showing the second processing of determining whether broadcasting/multicasting is permitted or inhibited. Referring to FIG. 9, if a desired printer can be consecutively detected twice by broadcasting/multicasting, it is determined that an environment in which broadcasting/multicasting can be performed is set.

In step S901, a printer information retrieval command is transmitted. At this time, as a destination address, for example, a limited broadcast address (255.255.255.255), a net direct broadcast address (192.168.0.225 in this embodiment), or a multicast address (224.0.0.1) indicating all systems on a subnet is designated. That is, in step S901, a printer information retrieval command is broadcast or multicast.

In step S902, the computer 1 waits for the reception of a response to the printer information retrieval command. A timeout is set for the reception, and the computer 1 determines in step S908 whether a response can be received within the time.

If a response can be received, the flow advances to step S904 to determine whether the response is from a desired printer. In this determination, it is determined whether the MAC address contained in the received response matches the MAC address of the printer 2 which is stored in the storage unit by the computer 1. If they match each other, a desired printer can be detected. In step S905, it is determined whether a flag is set. If the flag is set, it indicates that a desired printer has been able to be detected in printer detection processing using broadcasting/multicasting as well. Since the desired printer has been able to be consecutively detected twice, it is determined in step S906 that broadcasting/multicasting is permitted. The computer 1 then stores, in the storage unit such as a memory, information indicating that an environment in which broadcasting/multicasting can be performed is set, and terminates the determination processing. If no flag is set, since the desired printer is detected for the first time, a flag is set in step S907, and the flow advances to step S910.

If no response cannot be obtained in step S902, or the response does not match a desired printer in step S904, the computer 1 determines in step S908 whether a predetermined period of time has elapsed. If NO in step S908, the flow returns to step S902 to wait for the reception of a response again. If YES in step S908, since it indicates that a desired printer cannot be detected, the flag is cleared in step S909. In step S910, it is determined that broadcasting/multicasting is inhibited. The computer 1 then stores, in the storage unit such as a memory, information indicating that an environment in which broadcasting/multicasting cannot be performed is set, and terminates the detection processing.

In the above manner, the determination result of broadcasting/multicasting permission/inhibition determination processing is stored in the storage unit of the computer 1.

Referring to FIG. 9, when a desired printer can be consecutively detected twice by using a flag, it is determined that broadcasting/multicasting is permitted. In addition to this method, another method may be used, in which when a desired printer can be detected a predetermined number of times by using a counter which counts a predetermined number, it is determined that broadcasting/multicasting can be performed. In this case, the computer 1 determines whether the counter has counted a predetermined number, instead of performing step S905. If the counter has counted the predetermined number, the flow advances to step S906. If the counter has not counted the predetermined number, the computer 1 increments the counter instead of performing step S907. In addition, the computer 1 may clear the counter instead of performing step S909.

The above broadcasting/multicasting permission/inhibition determination processing needs to be performed in a state wherein a response can always be obtained as long as broadcasting/multicasting is not limited. While printing is performed by unicasting or immediately after it, the printer 2 is powered on and can operate normally. In other cases, the computer 1 may not be able to communicate with the printer because the printer is powered off or the state of the communication line is poor. Therefore, the first determination processing and second determination processing described with reference to FIGS. 8 and 9 are performed while printing is normally is performed or immediately after it.

Assume that in this embodiment, when the printing of a document, which has little influence on printing processing, is terminated, i.e., after a session termination command is executed in function EndDocPort( ) of the port monitor, the first or second determination processing is performed.

In this embodiment, in normal printing processing, the first or second determination processing using broadcasting/multicasting is added to determine whether broadcasting/multicasting is permitted or inhibited. However, the present invention is not limited to this method. Since it is only required to know whether a response can be obtained with respect to broadcasting/multicasting, a command unicast in normal communication may be replaced with broadcasting/multicasting. For example, a session termination command in this embodiment is broadcast/multicast, and the permission/inhibition of broadcasting/multicasting may be determined depending on whether a response can be received.

In addition, in actual device detection, when detection processing using broadcasting/multicasting is performed, the detection result may be reflected in permission/inhibition determination.

In this case, the determination method has been exemplified in the case wherein firewall settings cannot be known. If, however, the settings can be known by the API of the firewall or operating system, the operator may check the settings for every device detection instead of storing a determination result and referring to it at the time of device detection.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-165501 filed on Jun. 6, 2005, which is hereby incorporated by reference herein in its entirety.

What is claimed is:

1. A communication apparatus comprising:
a managing unit configured to manage a fixed address of a specific communication partner and a variable address of the specific communication partner;
a first transmitting unit configured to transmit a unicast retrieval signal for retrieving a changed variable address of the specific communication partner using unicast transmission with the variable address being changed from transmission to transmission; and
a detecting unit configured to detect a response signal, which contains the fixed address of the specific communication partner, of the unicast retrieval signal,
wherein the managing unit updates the variable address of the specific communication partner managed by the managing unit to be a response variable address contained in the response signal, which response signal contains the fixed address of the specific communication partner.

2. The apparatus according to claim 1, further comprising:
a second transmitting unit configured to transmit a broadcast or multicast retrieval signal for retrieving the specific communication partner using broadcasting or multicasting; and
a switching unit configured to switch between the transmitting by the first transmitting unit and the transmitting by the second transmitting unit.

3. The apparatus according to claim 1, further comprising:
a second transmitting unit configured to transmit a broadcast or multicast retrieval signal for retrieving the specific communication partner using broadcasting or multicasting; and
a storage unit configured to store the variable address of the specific communication partner.

4. The apparatus according to claim 3, wherein the managing unit updates the variable address of the specific communication partner stored in the storage unit to the response variable address contained in the response signal, which contains the fixed address of the specific communication partner of the unicast retrieval signal or the broadcast or multicast retrieval signal.

5. The apparatus according to claim 1, wherein the fixed address is a MAC address and the variable address is an IP address.

6. The apparatus according to claim 1, wherein the first transmitting unit changes a variable address within a predetermined range and repeats unicast transmission.

7. The apparatus according to claim 6, wherein the predetermined range is defined by a predetermined number of addresses each before and after a reference address.

8. A control method of a communication apparatus, the method comprising:
managing a fixed address of a specific communication partner and a variable address of the specific communication partner;
transmitting a unicast retrieval signal for retrieving a changed variable address of the specific communication partner using unicast transmission with a variable address being changed from transmission to transmission; and
detecting a response signal, which contains the fixed address of the specific communication partner, of the unicast retrieval signal,
wherein the managing step updates the variable address of the specific communication partner managed at the managing step to be a response variable address contained in the response signal, which response signal contains the fixed address of the specific communication partner.

9. A method comprising:
one of transmitting an information retrieval packet for searching a specific communication partner using broadcasting, and transmitting an information retrieval packet for searching the specific communication partner using multicasting;

automatically comparing, if a response to the information retrieval packet is received, a MAC address included in the received response to a MAC address of the specific communication partner;

performing, if a response to the information retrieval packet is not received, or if a response to the information retrieval packet is received and a MAC address included in the received response is different from the MAC address of the specific communication partner, the following steps: (a) transmitting an information retrieval packet for searching the specific communication partner using unicast transmission, (b) if a response to the unicast transmission is received, automatically comparing a MAC address included in the received response to the unicast transmission to the MAC address of the specific communication partner, and (c) if a response to the unicast transmission is not received, or if a response to the unicast transmission is received and a MAC address included in the received response to the unicast transmission is different from the MAC address of the specific communication partner, repeatedly performing steps (a), (b), and (c) with a destination IP address of the unicast transmission being successively changed in each transmission.

10. An apparatus comprising:

one of means for transmitting an information retrieval packet for searching a specific communication partner using broadcasting, and means for transmitting an information retrieval packet for searching a specific communication partner using multicasting;

means for receiving a response to the information retrieval packet;

means for automatically comparing, if a response to the information retrieval packet is received, a MAC address contained in the received response to a MAC address of the specific communication partner;

means for performing, if a response to the information retrieval packet is not received, or if a response to the information retrieval packet is received and a MAC address included in the received response is different from the MAC address of the specific communication partner, the following steps: (a) transmitting an information retrieval packet for searching the specific communication partner using unicast transmission, (b) if a response to the unicast transmission is received, automatically comparing a MAC address included in the received response to the unicast transmission to the MAC address of the specific communication partner, and (c) if a response to the unicast transmission is not received, or if a response to the unicast transmission is received and a MAC address included in the received response to the unicast transmission is different from the MAC address of the specific communication partner, repeatedly performing steps (a), (b), and (c) with a destination IP address of the unicast transmission being successively changed in each transmission.

* * * * *

UNITED STATES PATENT AND TRADEMARK OFFICE
CERTIFICATE OF CORRECTION

| | | |
|---|---|---|
| PATENT NO. | : 8,289,558 B2 | Page 1 of 1 |
| APPLICATION NO. | : 13/241710 | |
| DATED | : October 16, 2012 | |
| INVENTOR(S) | : Kiyoshi Katano | |

It is certified that error appears in the above-identified patent and that said Letters Patent is hereby corrected as shown below:

ON THE TITLE PAGE:

At item (73), Assignee:
"Canon Kabushika Kaisha" should read --Canon Kabushiki Kaisha--.

Signed and Sealed this
Twenty-seventh Day of November, 2012

David J. Kappos
*Director of the United States Patent and Trademark Office*